Feb. 24, 1942.  F. LINDGREN  2,273,970
COMBINATION HAY BUCK AND STACKER
Filed Nov. 19, 1940  4 Sheets-Sheet 1

Inventor
Frank Lindgren
By Clarence A. O'Brien
Attorney

Feb. 24, 1942.   F. LINDGREN   2,273,970
COMBINATION HAY BUCK AND STACKER
Filed Nov. 19, 1940   4 Sheets-Sheet 2
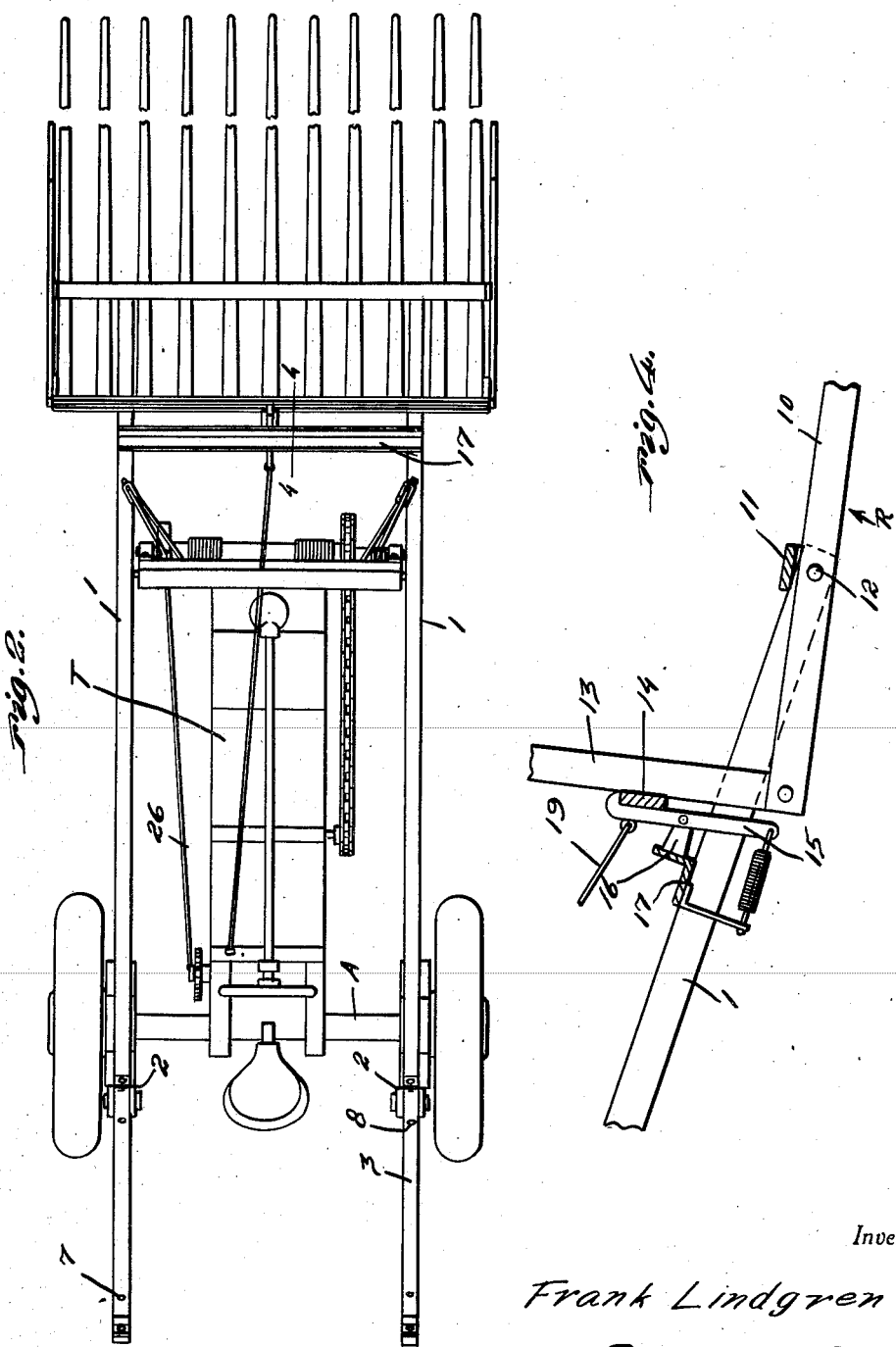
Inventor
Frank Lindgren
By Clarence A. O'Brien
Attorney Feb. 24, 1942.  F. LINDGREN  2,273,970
COMBINATION HAY BUCK AND STACKER
Filed Nov. 19, 1940  4 Sheets-Sheet 3
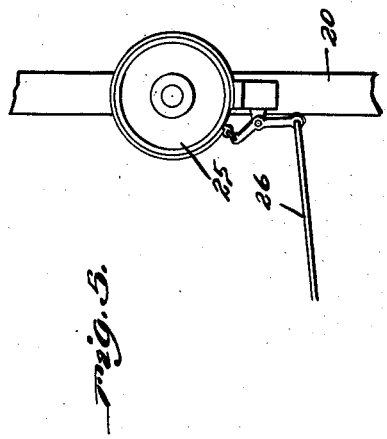
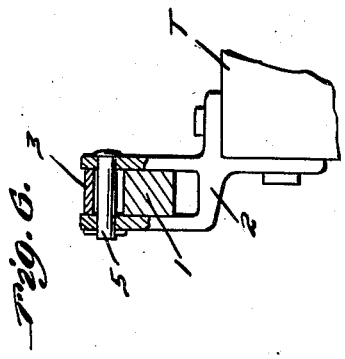
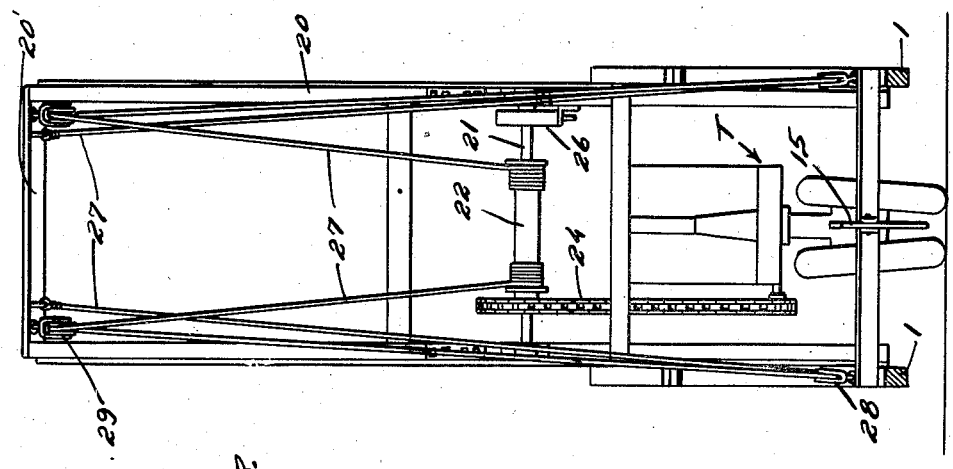
Inventor
Frank Lindgren
By *Clarence A. O'Brien*
Attorney

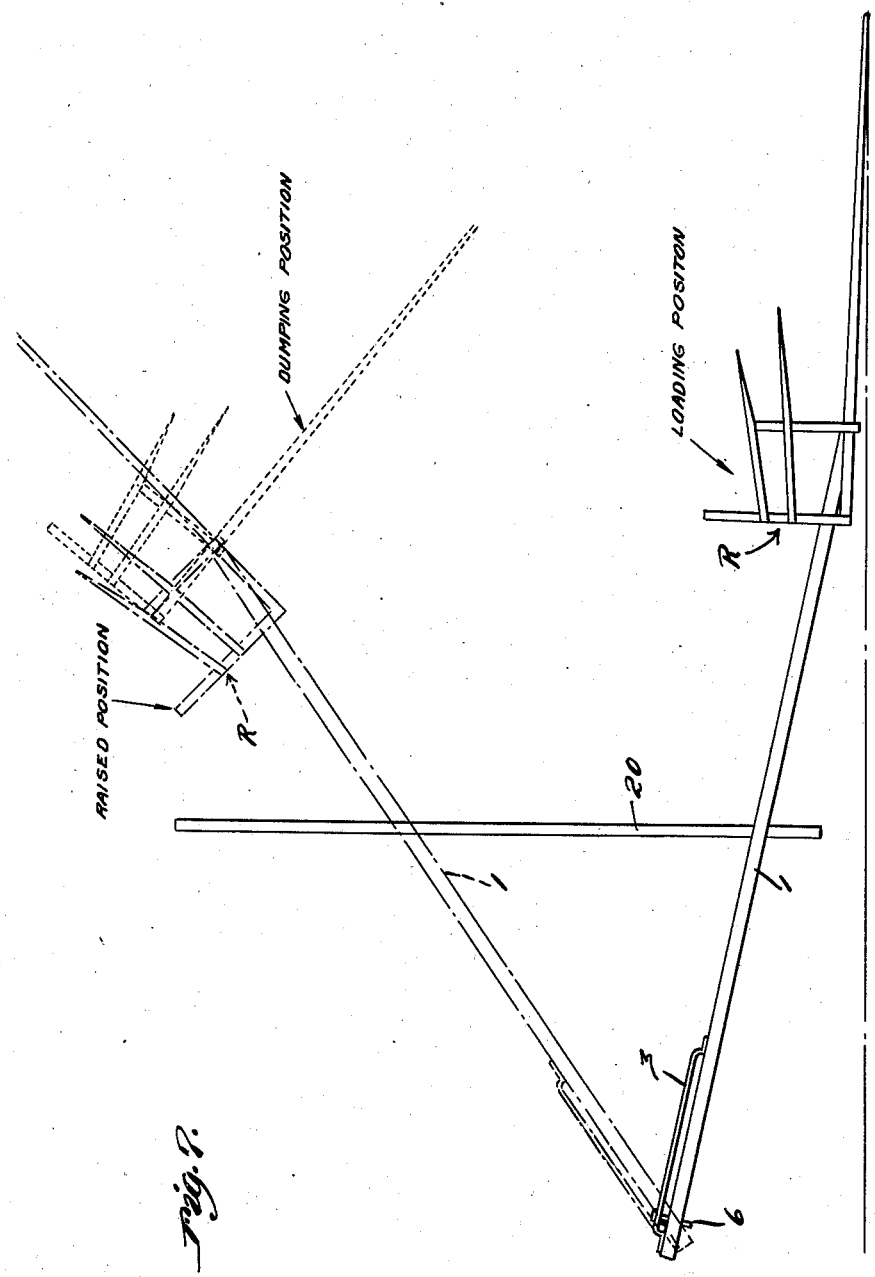

Patented Feb. 24, 1942

2,273,970

UNITED STATES PATENT OFFICE 2,273,970

COMBINATION HAY BUCK AND STACKER

Frank Lindgren, Lanyon, Iowa

Application November 19, 1940, Serial No. 366,309

1 Claim. (Cl. 214—141)

This invention relates to a hay buck and stacker, the general object of the invention being to pivotally connect the beams of the device to parts of a tractor above the axle thereof so that the device can be raised higher than it could if the beams were attached to the tractor underneath the axle.

Another object of the invention is to provide means whereby the beams can be adjusted on their pivotal points so that the swing of the device can be regulated in accordance to its use for loading or stacking or when the device is being transported from one place to another.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which—

Figure 2 is a top plan view of Figure 1.

Figure 3 is a section on the line 3—3 of Figure 1.

Figure 4 is a section on the line 4—4 of Figure 2.

Figure 5 is a detail view showing the brake means for the winding drum.

Figure 6 is a detail view partly in section showing the means for slidably supporting one of the beams of the device.

Figure 7 is a diagrammatic view showing the various positions of the parts in loading, dumping and in raised positions.

Figure 1:
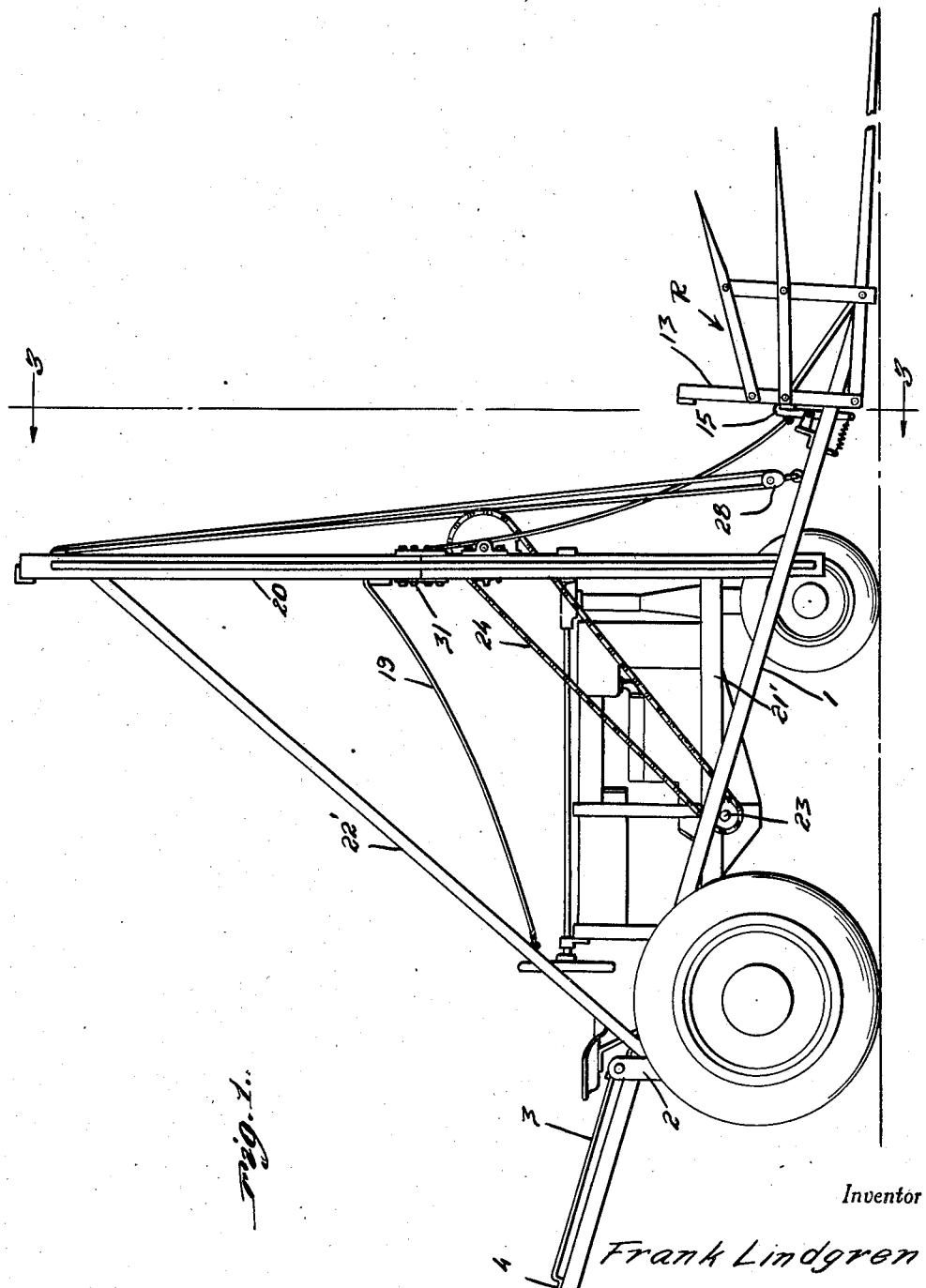
Figure 1 is an elevational view showing the invention applied to a tractor.

In these drawings the two beams of the stacker and loader are shown at 1 and these beams extend along the sides of the tractor T and forked brackets 2 are fastened to rear portions of the tractor adjacent the sides thereof and in rear of the rear axle A of the tractor and above the plane of the axle. The rear ends of the beams 1 pass through the prongs of these brackets and a strip or plate 3 has its major portion extending parallel to the upper edge of each beam at the rear thereof with the ends of the plate turned downwardly and fastened to said top face or edge as shown at 4. This plate passes over a pin 5 carried by the upper ends of each set of prongs as more clearly shown in Figure 6 so that each beam 1 is slidably supported from a bracket 2 slightly in rear and above the rear axle of the tractor. The beams 1 can be held in extended position by the brackets 2 by pulling them forwardly and then passing pins 6 through holes 7 in the plates 3 and in parts of the beams so that the beams are held with the pins 5 adjacent their rear ends as shown in Figure 2. When desired the pins 6 can be raised so that the beams can be swung rearwardly and then the pins 6 placed in the holes 8 in the forward ends of the plates 3 which are arranged above holes in the beams and then the beams will be held in shortened position relative to the tractor so that the tractor can be swung on a shorter arc when turning in a field, for instance, and this latter position of the beams can be used for loading. However, for stacking, particularly when the stack is high it is preferable to have the beams in the position shown in Figure 7. Thus it will be seen that the pivotal points about which the beams swing can be adjusted forwardly or rearwardly as desired, and that such pivotal points are above the axle of the tractor so that the beams can be swung upwardly to a considerable extent.

A rake R is carried by the front end of the two beams 1 and said rake includes a plurality of prongs 10 and a cross piece 11 with the front ends of the beams 1 connected with the cross piece in a pivotal manner as shown at 12. The rake also includes the upright part 13 which includes the cross bar 14 adapted to be engaged by a spring actuated latch 15 pivoted to a bracket 16 carried by a cross piece 17 which has its ends connected with the beams 1. A cable 19 connects the upper end of the latch with a lever or part adjacent the driver seat so that the driver of the tractor can by pulling upon the cable release the latch to permit the rake R to dump as will be hereinafter described.

An upright frame 20 is supported at the front of the tractor by means of the bars 21' and the braces 22' and an intermediate part of this upright frame 20 has a cross shaft 21 carried thereby which supports a drum 22 and said drum is connected to the take-off shaft 23 of the tractor by the chain and sprockets shown generally at 24. The shaft also carries the braking means 25 which are controlled by a cable 26 leading to a point adjacent the driver seat so that the driver of the tractor can control the braking means. A pair of cables 27 each has one end connected to the top 20' of the frame 20 and said cables pass downwardly over the pulleys 28 on forward parts of the beams 1 and then the cables pass upwardly over the pulleys 29 depending from the cross piece 20' and then the cables pass downwardly and are connected with the drum 22. Thus I provide a simple system of rope pulleys and ropes or cables for raising and lowering the rake assembly.

From the foregoing it will be seen that with the parts in loading position as shown in Figure 7 the tractor can be moved forwardly so that the rake will pick up the load and then after the rake is full the operator connects the take-off shaft with the drive means in the usual manner so that the chain 24 is driven from the take-off shaft which rotates the drum so that the rake is lifted to the position shown in Figure 7 and then the brake is applied to hold the parts in raised position and then the operator pulls upon the cable 19 to release the latch 15 so that the rake will dump itself by moving to dumping position shown in Figure 7. Then the parts are lowered in the original position to again pick up a load. As before stated the pivotal points of the beams 1 can be adjusted forwardly and rearwardly by means of the pins 6 and as the drum is driven by chain and sprocket means there is no slipping between the parts as there would be if a belt was used.

The upright frame 20 is formed of two sections, the divider line being shown at 31 so that the upper portion of the upright frame can be removed whenever it is desired to use the short upright but, of course, when this is done the upper cross bar with the pulleys would have to be placed on the lower section.

This invention can also be used as a manure loader by using a manure fork instead of the rake or hay fork and it can also be used for loading dirt by using a shovel in place of the fork.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A loading and stacking attachment for a tractor comprising a pair of short uprights at the rear of the tractor, a pair of long uprights at the front of the tractor, a pair of beams extending alongside the tractor and pivotally connected at the rear portions of the short uprights, means for adjusting the extent the beams extend in front of the short uprights, a load carrying member connected with the front ends of the beams, the uprights of the front of the tractor being formed in sections detachably connected together, a drum carried by the lower section, means for rotating the drum, means, including cables connected with the drum, for raising and lowering the beams by rotary movement of the drum, said means also including pulleys and a cross piece extending across the upper ends of the front uprights and carrying some of the pulleys and having parts of the cables connected therewith, said cross piece being adapted to connect the upper ends of the lower sections of the uprights together when the upper sections have been removed.

FRANK LINDGREN.